United States Patent

Lotens et al.

[19]

[11] Patent Number: 6,159,268
[45] Date of Patent: Dec. 12, 2000

[54] PROCESS FOR PYROMETALLURGICAL PROCESSING IN A FURNACE CHAMBER, OF METAL-CONTAINING WASTE

[75] Inventors: Jan Pieter Lotens, Apeldoorn, Netherlands; Klaus Jungk, Köln, Germany

[73] Assignee: Droan B.V., Netherlands

[21] Appl. No.: 09/332,328

[22] Filed: Jun. 14, 1999

[30] Foreign Application Priority Data

Jun. 15, 1998 [NL] Netherlands ............................ 1009412

[51] Int. Cl.⁷ ...................................................... C22B 7/00
[52] U.S. Cl. ................................. 75/414; 75/658; 75/669; 75/691; 75/695
[58] Field of Search .............................. 75/414, 658, 669, 75/691, 695; 588/224

[56] References Cited

U.S. PATENT DOCUMENTS

| | | | |
|---|---|---|---|
| 4,017,307 | 4/1977 | Winterhager et al. | 75/404 |
| 4,358,311 | 11/1982 | Weigel t al. | 75/639 |
| 4,362,561 | 12/1982 | Weigel et al. | 75/643 |
| 5,765,489 | 6/1998 | Hugentobler et al. | 110/344 |

FOREIGN PATENT DOCUMENTS

| | | |
|---|---|---|
| 0475128 | 8/1991 | European Pat. Off. . |
| 0714860 | 6/1996 | European Pat. Off. . |
| 2348105 | 4/1975 | Germany . |
| 2922189 | 10/1980 | Germany . |
| 3629661 | 3/1988 | Germany . |
| 3638204 | 5/1988 | Germany . |
| 4142401 | 6/1993 | Germany . |

OTHER PUBLICATIONS

Ameis et al, "Process and Equipment for the Smelting of Fusible Materials Such as Ore Concentrate, Utilising Unspent Reducing Gas from the Top–Blowing Process in the Melting Cyclone", DE 3,638,204 Abstract May 11, 1988.
Derwent Acc–No. 1988–071673, Bock et al, DE–3629661 A1, Aug. 30, 1986.
Derwent Acc–No. 1993–206341, Lissack et al, DE–4142401 A1, Jan. 24, 1993.

*Primary Examiner*—Roy V. King
*Assistant Examiner*—Tima McGuthry-Banks
*Attorney, Agent, or Firm*—Webb Ziesenheim Logsdon Orkin & Hanson, P.C.

[57] ABSTRACT

The invention relates to a process for pyrometallurgical processing, in a furnace chamber, of metal-containing waste which may also contain a quantity of organic material. The process involves a reducing gas being blown with high velocity onto the surface of the smelt in which the metal oxides are present in the molten state, the reducing gas being made by incomplete combustion of a fuel and/or the organic material and an oxygen-containing gas. Additionally, steam and/or an oxygen-rich gas such as almost pure oxygen are injected, roughly parallel to the surface of the smelt, into the oven chamber above said surface. The total amount of oxygen used in the furnace chamber is lower than the amount required stoichiometrically for complete combustion of the organic material together with the fuel.

15 Claims, 1 Drawing Sheet

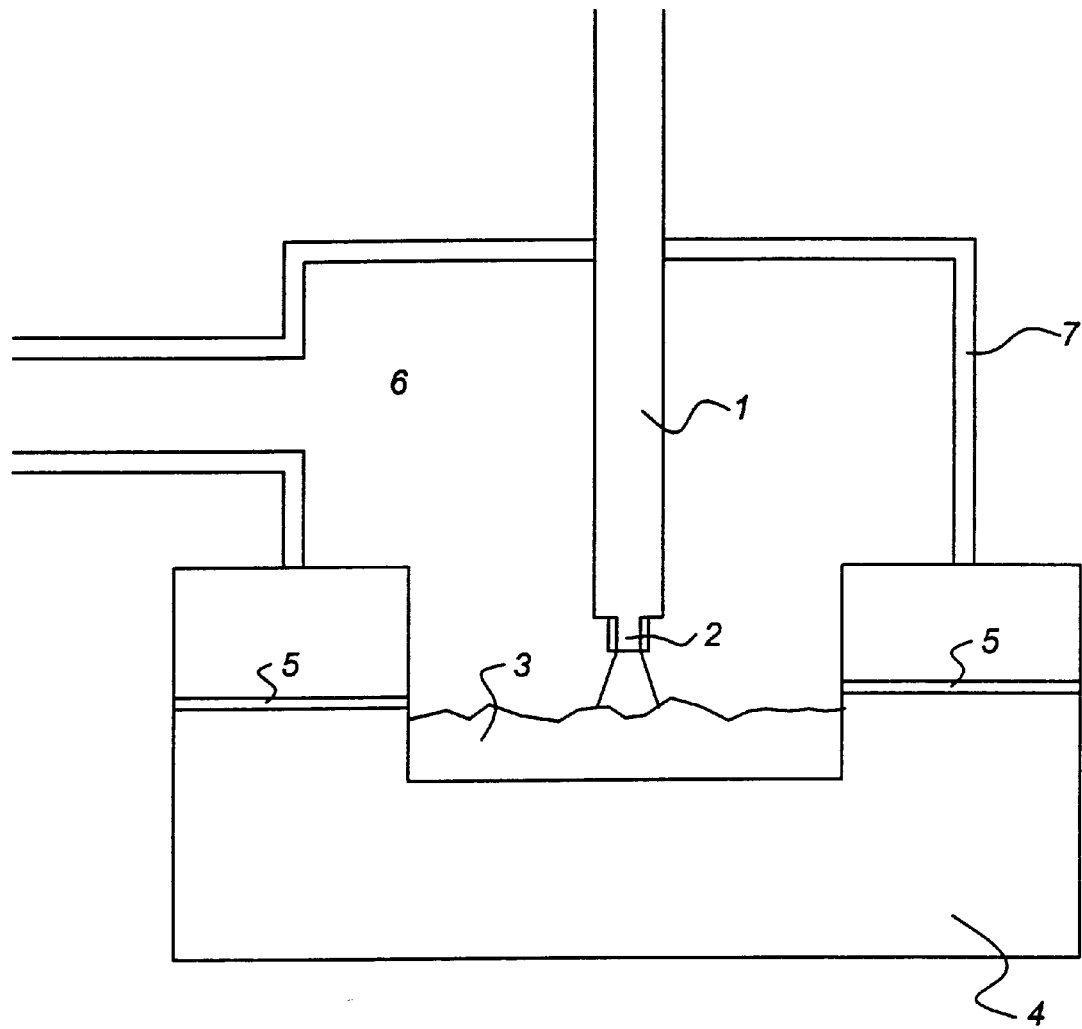

PROCESS FOR PYROMETALLURGICAL PROCESSING IN A FURNACE CHAMBER, OF METAL-CONTAINING WASTE

BACKGROUND OF THE INVENTION

This invention is directed to a pyrometallurgical process for material that may be metal-containing waste with the metal compounds in part being reduced and evaporated and in part remaining in the liquid slag. The smelting conditions are reducing to the extent that metal oxides such as those of zinc, cadmium, lead, tin and the like are reduced and the metals or metal compounds formed pass into the vapour phase and are discharged with the gas phase. Preferably, the waste materials contain a major fraction of organic material, since this wholly or partially obviates the need to use a separate fuel. An example of this is the solid residue which remains after a pyrolysis step. This contains large amounts of carbon and additionally an inorganic fraction. Sewage sludge also fits into this category. If these materials are processed in a fossil fuel-fired smelter, difficulties may arise, however. This is because such materials present the problem that carbon particles are not present in molten form and therefore require a relatively long time for complete combustion. The as yet uncombusted carbon particles will float on the slag formed, which may have an adverse effect on the quality of the ultimate slag, since carbon forms weak spots in the crystallized slag. In addition, inorganic constituents may remain trapped in the carbon, whereas it would be preferable for these to be dissolved in the slag to prevent leaching of the latter or even to prevent it. Moreover, the caloric content of the unreacted carbon is not utilized.

To solve the abovementioned problem, the German Offenlegungsschift 36 29 661 proposes that additional air be introduced in the bottom section of the smelting reactor just above the molten slag. The oxygen from this air then serves the purpose of completely combusting the carbon particles. According to this method, however, afterburning is carried to completion, and the conditions in the smelting reactor are therefore oxidizing. This entails two drawbacks. Firstly, a number of metals cannot then be completely removed from the slag (such as zinc, lead, tin, arsenic and the like), and secondly it is thus not possible to produce any fuel gas or synthesis gas in the smelter.

German Offenlegungsschrift 36 38 204 A discloses a process for processing of metal containing substances like ore concentrates according to which the substances are smelted in the oxidative atmosphere of a smelting cyclone furnace. For recovering the valuable metals therefrom the obtained smelt is then finally processed by blowing a reducing gas on the smelt present in a blowing reactor positioned after the smelting cyclone furnace. The waste gas of the blowing reactor being mainly carbon monoxide, hydrogen, metal vapour or metal compounds in vapour form is led to the smelting cyclone furnace counter-currently with respect to the flow direction of the smelt. This waste gas can be burned therein providing a part of the heat requirement of the smelting cyclone furnace. So, the production of a usuable synthesis gas, which can be obtained after removal of the evaporated metals or metal compounds from the flue gas is missing in the process according to said German Offenlegungsschrift 36 38 204.

German Offenlegungsschrift 29 22 189 being discussed as prior art in the abovementioned German Offenlegungsschrift 36 28 204, discloses a process for the processing of smeltable substances like sulfidic ore concentrate and simultaneously the winning of valuable metals, wherein for the final processing of the smelt reducing gases optionally preceded by oxidizing or neutral gases respectively were blown through several supply ducts virtually perpendicularly on the smelt in a blowing reactor. The slag formed and the specifically heavier metal phase are then separated from each other.

In German Offenlegungsschrift 41 42 401 a process is described for controlling the heating of a furnace based on one or more burners, for instance a smelting furnace for metals or glass, wherein the formation of nitrogen oxides is reduced. However, in this process, leading to an ultimately total combustion, no supply ducts are used, through which gases having a high velocity can be blown against the surface of the smelt.

Further German Offenlegungsschrift 23 48 105 discloses a thermal process for the continuous extraction of metals and/or metal compounds from ores, concentrates thereof etc., wherein the liquid product from the furnace is separated by means of centrifugal forces in a metal smelt on the one hand and slags on the other hand.

It is an object of the invention to develop a process for working up metal-containing waste material which may also contain organic material, for example pyrolysis residues, which process does not suffer the drawbacks involved in the processes known in the prior art.

BRIEF SUMMARY OF THE INVENTION

The invention is directed to a pyrometallurgical process for metal-containing waste which also has a quantity of organic material comprising the steps of: (a) blowing a reducing gas with high velocity onto the surface of the smelt in which metal oxides are present in the molten state, whereby the reducing gas is produced by incomplete combustion; and (b) injecting an oxidizing gas in a direction with a component parallel to the surface of the smelt into the furnace chamber above the surface of the smelt, wherein the total amount of oxygen used in the furnace chamber is lower than the amount required stoichiometrically for complete combustion of the organic material together with the fuel.

BRIEF DESCRIPTION OF THE DRAWING

The sole FIGURE illustrates a schematic view of a furnace that may be utilized to implement the subject invention.

DETAILED DESCRIPTION OF THE INVENTION

With the aid of the above-defined process according to the invention it is now possible to effect virtually complete combustion of the carbon floating on the smelt. When steam is fed in, a water gas reaction ($C+H_2O \rightarrow CO+H_2$) takes place under the conditions prevailing in the furnace chamber, and if an oxygen-rich gas, for example gas containing at least 50 vol % of oxygen, advantageously at least 75 vol % and preferably almost pure oxygen is fed in, a burn-off reaction ($C+O_2 \rightarrow CO/CO_2$) takes place. To obtain as large a residence time as possible for the steam or the oxygen-rich gas introduced, these are advantageously introduced tangentially into the furnace chamber. For example, the steam or the oxygen-rich gas can be introduced at a tangential velocity of 10–50 m/s into a cylindrical furnace chamber.

Although the introduction of the steam or the oxygen-rich gas into the furnace chamber has the effect of locally generating an oxidizing environment, care should be taken to ensure that overall a reducing environment will exist in the furnace chamber, such that the value of λ (λ=1 if the stoichiometric amount of oxygen for complete combustion of the fuel introduced and the carbon present or of other organic materials to $CO_2$ and $H_2O$ is present) is less than 1, advantageously between 0.3 and 0.9 and preferably about 0.5. Such a λ in the furnace chamber overall can readily be set by the amount of metered-in oxygen in the burner and with the additional bottom feed being controlled in such a way that it is substoichiometric with respect to the total amount of combustible material in fuel and/or organic material present in the feed. The oxygen content of the oxygen-containing gas used is advantageously greater than 50 vol %, preferably greater than 70 vol %. Moreover, the reducing gas which is introduced into the furnace chamber is optionally injected at an angle of more than 45°, preferably at an angle of virtually 90° with respect to the surface of the waste smelt. In so doing, said reducing gas is directed, at a high velocity of more than 100 m/s, advantageously between about 100 m/s and 300 m/s, via one or more single-jet burners, against the surface of the waste smelt so as to produce a depression therein. Thus renewal takes place of the waste material exposed to the reducing gas, so that continuous reduction of the metal oxides present in the waste smelt can occur.

With the aid of the process according to the invention it is also possible to effect a separation between metals which, under the conditions prevailing in the furnace chamber, are volatile and less volatile. At furnace temperatures in the range of from 1000 to 1700° C. and under certain reducing conditions it is possible for metals or metal compounds having a high vapour pressure (such as Zn, Cd, As, Pb) to be separated from metals which are not reduced (such as iron, aluminium).

The process according to the invention can be illustrated with reference to the following description. The smelting reactor 4 is advantageously a cylindrical chamber having a double-walled steel plate jacket 7 which is cooled with cooling water or possibly steam and which is internally lined with refractory material and is provided with an outlet for the waste gases. At the top both a vertical burner 2 and a feed unit, are present. The feed is reasonably dry and fine and consequently can, for example, be conveyed pneumatically. With the aid of the burner 2, a reducing mixture of a fuel and an oxygen-containing gas is blown virtually perpendicularly against the surface of the smelt 3 at a high velocity of more than 100 m/sec so as to produce, owing to the momentum of the gas jet, a depression or slight movement of the smelt surface. Just above the surface a number of supply ducts 5 are positioned for adding an oxygen-containing gas or steam to cause the carbon floating on the slag to burn off or be removed by a reaction. Owing to a 80 <1 being set in the furnace chamber overall, the fuel gas discharged via the exhaust duct 6 still has a considerable calorific value and also, having been cleaned, is suitable as a synthesis gas. The fuel gas may contain volatilized metals or metal compounds which can be trapped in the usual manner, for example by cooling, postoxidation and filtering. Remaining in the furnace are slags of inorganic materials such as $SiO_2$-containing smelts. These can be tapped off right at the bottom of the reactor with the aid of a slag tuyere.

What is claimed is:

1. A method for pyrometallurgical processing, in a furnace chamber, metal-containing waste which also contains a quantity of organic material to produce smelt, comprised of the steps of:
    a) blowing a reducing gas with sufficient velocity onto the surface of the smelt to produce a depression in which metal oxides are present in the molten state, whereby the reducing gas is produced by incomplete combustion; and
    b) injecting an oxidizing gas in a direction with a component parallel to the surface of the smelt into the furnace chamber above the surface of the smelt, wherein the total amount of oxygen used in the furnace chamber is lower than the amount required stoichiometrically for complete combustion of the organic material.

2. The method according to claim 1 wherein the reducing gas is introduced into the furnace chamber via one or more single-jet burners.

3. The method according to claim 1 wherein the reducing gas is introduced into the furnace chamber in a direction which forms an angle of from 45–90 degrees with the surface of the smelt.

4. The method according to claim 3 wherein the angle is 90 degrees.

5. The method according to claim 1 wherein the reducing gas has a velocity of greater than 100 m/s to produce a depression of the surface of the smelt.

6. The method according to claim 1 wherein the furnace chamber is cylindrical and the oxidizing gas is introduced tangentially into the furnace chamber via one or more feeders just above the surface of the waste smelt.

7. The method according to claim 1 wherein the oxidizing gas is an oxygen-rich gas.

8. The method according to claim 7 wherein the oxidizing gas is an oxygen-rich gas which contains over 95% by volume of oxygen.

9. The method according to claim 1 where the stoichiometric value λ is maintained between 0.3 and 0.9 within the entire furnace chamber.

10. The method according to claim 9 wherein the stoichiometric value λ is maintained at approximately 0.5.

11. The method according to claim 1 wherein the furnace is an externally cooled smelting reactor.

12. The method according to claim 1 wherein the reducing gas is made by incomplete combustion of a fuel.

13. The method according to claim 1 wherein the reducing gas is made by incomplete combustion of an organic material and an oxygen-containing gas.

14. The method according to claim 1 wherein the reducing gas is made by incomplete combustion of a fuel and an organic material and an oxygen-containing gas.

15. The method according to claim 1 wherein the oxidizing gas is steam.

* * * * *

UNITED STATES PATENT AND TRADEMARK OFFICE
CERTIFICATE OF CORRECTION

PATENT NO.   : 6,159,268
DATED        : December 12, 2000
INVENTOR(S)  : Jan Pieter Lotens Page 1 of 1

It is certified that error appears in the above-identified patent and that said Letters Patent is hereby corrected as shown below:

Title page,
Item [56] References Cited, U.S. PATENT DOCUMENTS, second reference, "Weigel t al." should read -- Weigel et al. --.

Column 3,
Line 41, "unit," should read -- unit 1, --.
Line 51, "Owing to a 80" should read -- Owing to a $\lambda$ --.

Signed and Sealed this

Eleventh Day of September, 2001

*Attest:*

*Attesting Officer*

NICHOLAS P. GODICI
*Acting Director of the United States Patent and Trademark Office*